United States Patent [19]
Klotz

[11] Patent Number: 5,730,950
[45] Date of Patent: Mar. 24, 1998

[54] SULFURIC ACID WASTE RECYCLING BY REGENERATIVE PROCESS

[75] Inventor: William L. Klotz, Matthews, N.C.

[73] Assignees: Jennifer L. Klotz; Laurie J. Klotz, both of Matthews, N.C.

[21] Appl. No.: 670,373

[22] Filed: Jun. 25, 1996

[51] Int. Cl.$^6$ .................... C01B 17/90; C01B 17/69; C01B 17/50
[52] U.S. Cl. .................... 423/531; 423/522; 423/541.1; 423/DIG. 2
[58] Field of Search .................... 423/522, 530, 423/531, 541.1, DIG. 2; 588/234

[56] References Cited

U.S. PATENT DOCUMENTS

| | | | |
|---|---|---|---|
| 2,055,419 | 9/1936 | Rosenstein | 423/530 |
| 2,280,508 | 4/1942 | Bousquet et al. | 423/530 |
| 3,676,107 | 7/1972 | Barnard et al. | 423/DIG. 2 |
| 3,745,207 | 7/1973 | Hansen | 423/533 |
| 3,906,039 | 9/1975 | Furkert | 423/DIG. 2 |
| 3,917,800 | 11/1975 | McGauley et al. | 423/530 |
| 4,083,693 | 4/1978 | Hansen | 423/533 |
| 4,153,628 | 5/1979 | Gerken et al. | 423/522 |
| 4,163,047 | 7/1979 | Dorr et al. | 423/522 |

Primary Examiner—Gary P. Straub
Attorney, Agent, or Firm—Kilpatrick-Stockton

[57] ABSTRACT

The process will recover sulfuric acid on the 90–95% concentration range by roasting of ferrous sulfate hydrate crystals at high temperature under retort conditions. In the first step of the recovery process 6 (see FIG. 1) hydroxide slurry is reacted with the waste stream, and ferrous sulfate crystals obtained. In the second step 9 iron sulfate crystals are roasted and water of hydration reacts with sulfate and sulfur trioxide to produce sulfuric acid in a retort operation. The sulfuric acid and sulfur trioxide are condensed or absorbed in water or dilute sulfuric acid and are of a high purity, leaving iron oxide as a recovered carrier. In the third step, this iron oxide/hydroxide is reduced 13 and used to produce a slurry, which is pumped back to react with the entering sulfuric acid waste stream. The process has the following advantages:

- continuous operation
- non-exotic and inexpensive chemicals are used
- high purity sulfuric acid is recovered
- can operate at large and small production levels
- low maximum temperature for sulfuric acid recovery (750 degrees C.).

12 Claims, 5 Drawing Sheets

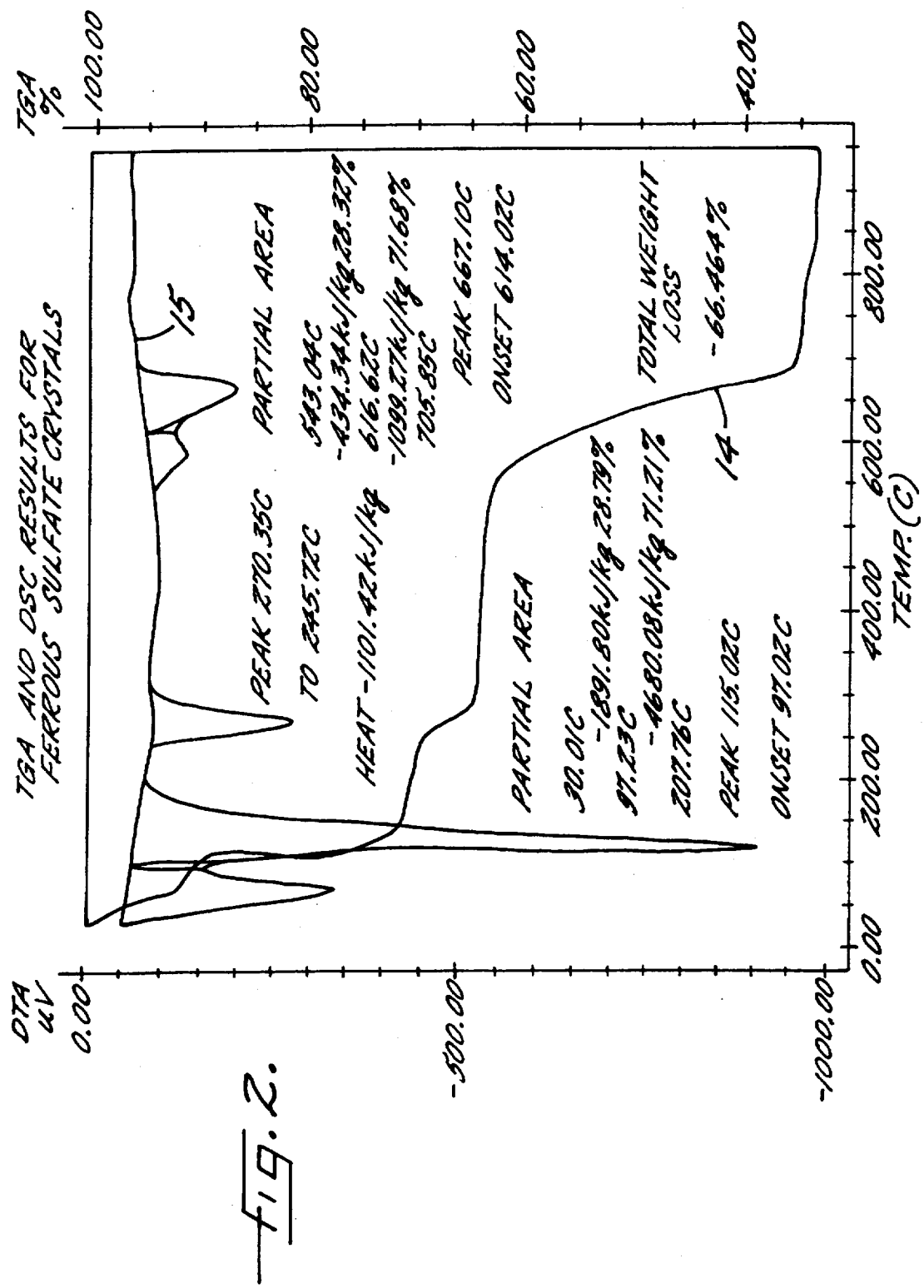

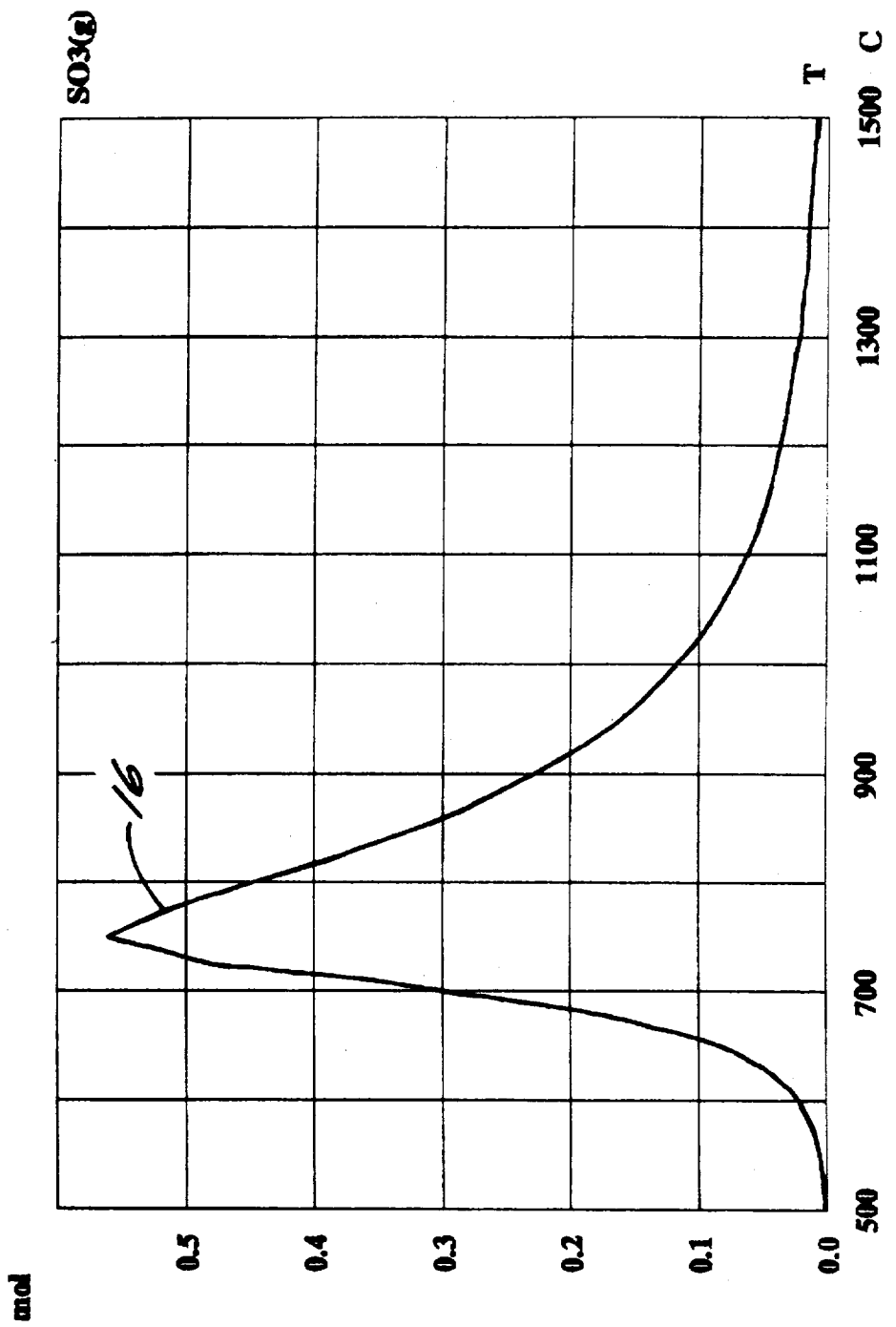

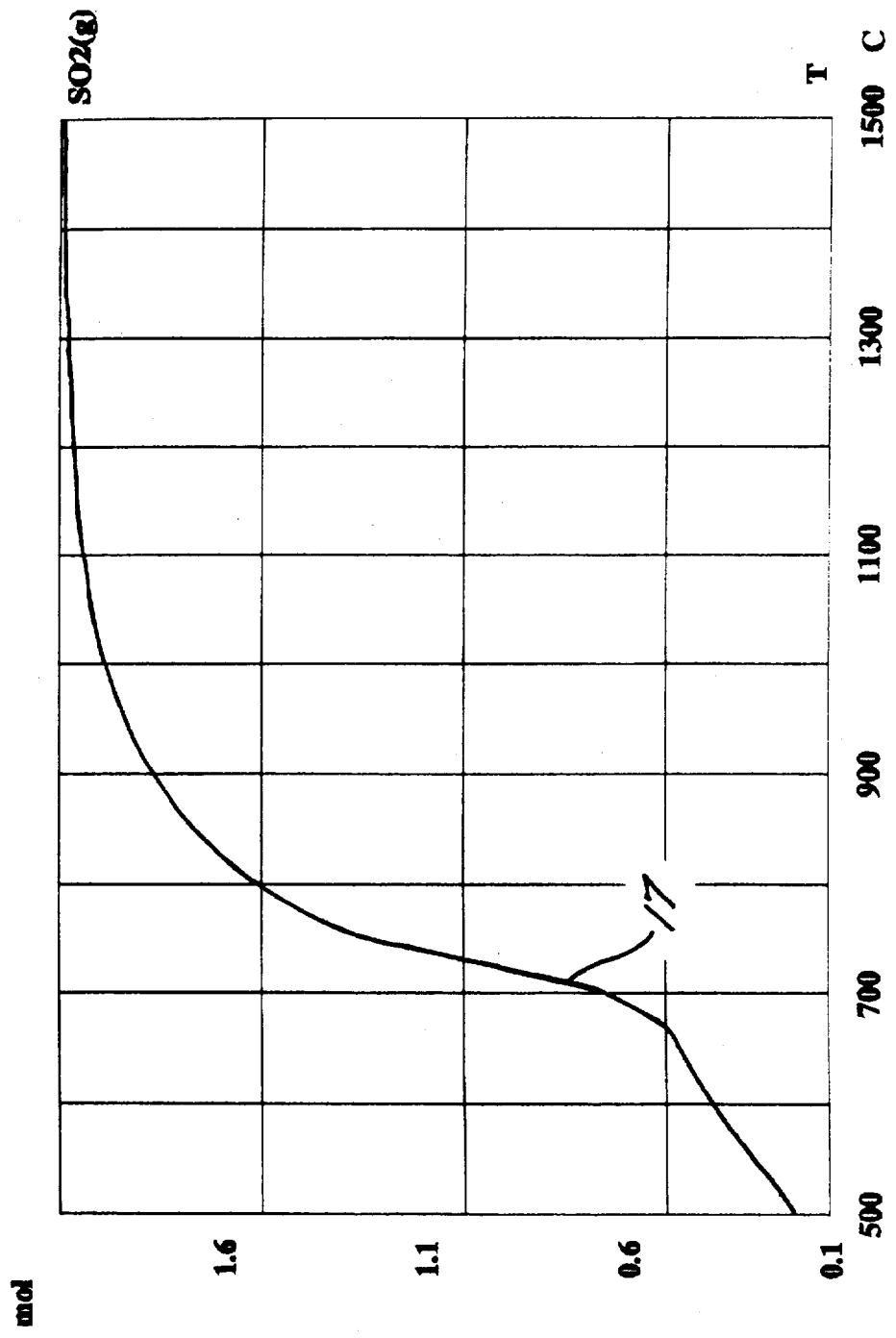

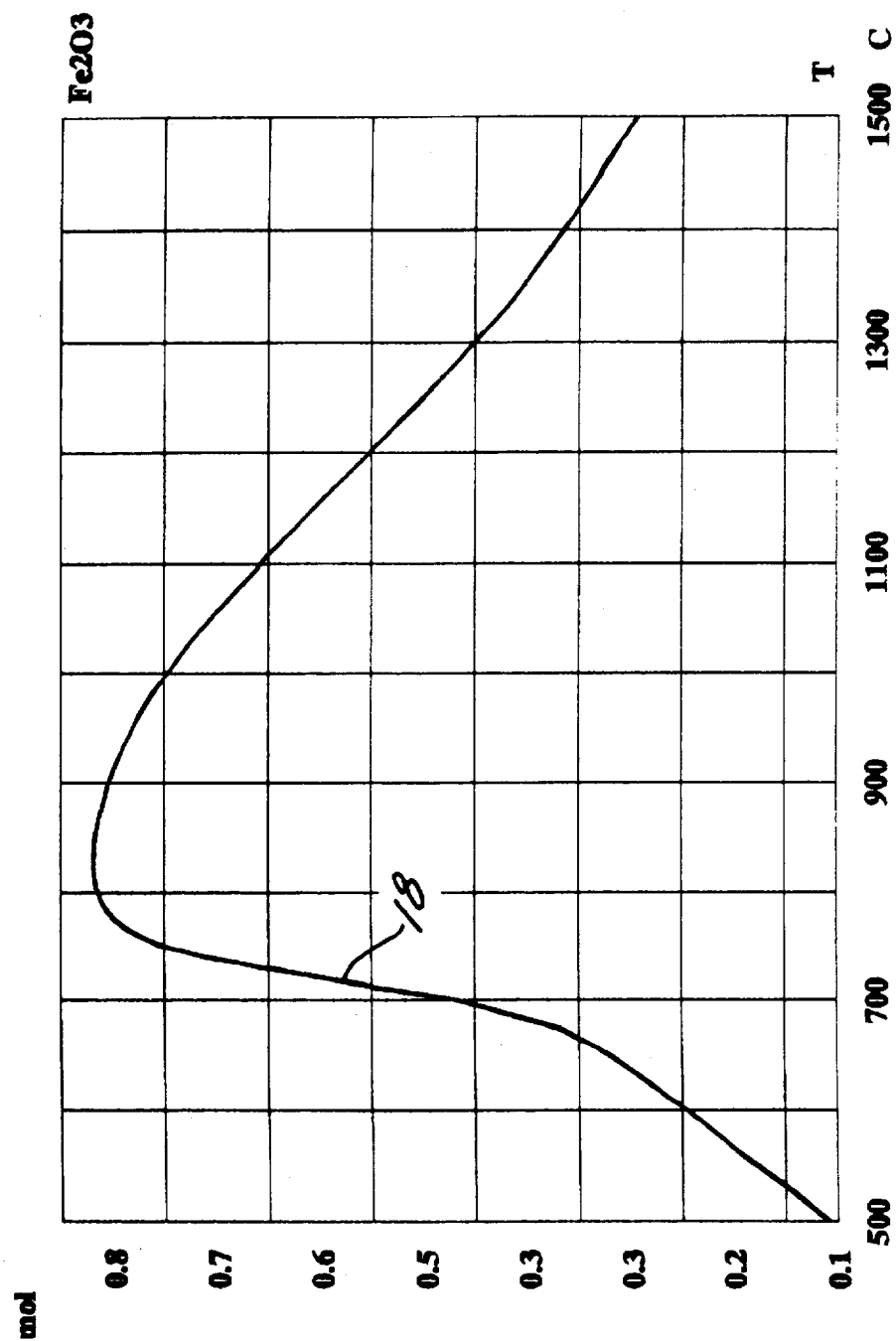

SULFURIC ACID WASTE RECYCLING BY REGENERATIVE PROCESS

CROSS REFERENCES TO RELATED APPLICATIONS

References

No reference to prior inventions of William L. Klotz

BACKGROUND—FIELD OF INVENTION

Method:

This patent relates to a new method for recycling sulfuric acid in very pure form and concentration adjustable from low to greater than 100%, or fuming sulfuric acid.

BACKGROUND—DESCRIPTION OF PRIOR ART

Sulfuric acid ($H_2SO_4$) is a basic raw material used in a wide range of industrial processes and manufacturing operations. Almost 70 percent of sulfuric acid manufactured is used in the production of phosphate fertilizers. Other uses include copper leaching, inorganic pigment production, petroleum refining, paper production, and industrial organic chemical production.

Sulfuric acid may be manufactured commercially by either the lead chamber process or the contact process. Because of economics, all of the sulfuric acid produced in the U.S. is now produced by the contact process. U.S. facilities produce approximately 42 million megagrams (Mg) (46.2 million tons) of $H_2SO_4$ annually.

Ferrous sulfate has been researched extensively as a recovery product for waste sulfuric acid, for example, in the steel industry as pickle liquor recovery, Sulfuric Acid and Ferrous Sulfate Recovey from Waste Pickle Liquor by Thornton, W. E. in US EPA ORD Series EON-660/2-73-032 (01/00/94) and Recovery of Ferrous Sulfate and Sulfuric Acid from Spent Pickle Liquor of the Steel Industry by Niecko, Jerzy in Conservation and Recycling Vol 10 No. 4 (00/00/87). The proposed process will extend this research to recover sulfuric acid, a much more useful product, from the ferrous sulfate product. Inventor William L. Klotz has successfully proposed feasibility testing and completed testing the process for a textile dye manufacturering process, conducting a bench scale treatability study, followed by pilot scale tests, of this process. The result is a process that provides useable and concentrated sulfuric acid from dilute waste streams that previously required expensive neutralization. The existence of dilute sulfuric acid waste streams is so wide spread in industry that extensive application should result inside and outside the textile dye industry.

Three main prior art approaches identified by prior art search as suitable for pollution control are: 1) The conversion of waste sulfuric acid to $SO_2$ by roasting either sulfate salts or heat processing the existing solution, followed by conversion of $SO_2$ to sulfuric acid in a catalytic sulfuric acid process, 2) Conversion of waste sulfuric acid to ferrous sulfate utilizing scrap iron or ferrous ore with disposal or sale of the ferrous sulfate commercially, and 3) sulfuric acid membrane processes for concentration. Other prior art approaches less suitable for pollution control include:

Chemetrics Process

The Chemetrics process can be used for nitrated and high organic waste streams, but is very capital intensive. This process is described by G. M. Cameron and H. C. Peterson, 1986. ChemEtics Ltd. Toronto Ontario by Cameron, G. M. and H. C. Peterson in Corporate Source (00/00/86)

Electrochemical Process

Electrochemical process exist that electrolytically decomposes sulfuric acid, then regenerate the acid with a sulfur dioxide electrochemical oxidizer cell, as reported by A. Hammache and E. Bilgen, 1992, This process is quite costly to implement on a small scale, but has little impurity interference.

Spent Acid And Hydrogen Sulfide Burning Plants

This is a contact process sulfuric acid plant that burns spent acid. Two types of plants are used to process this type of sulfuric acid. In one, the sulfur dioxide and other products from the combustion of spent acid and/or hydrogen sulfide with undried atmospheric air are passed through gas cleaning and mist removal equipment. The gas stream next passes through a drying tower. A blower draws the gas from the drying tower and discharges the sulfur dioxide gas to the sulfur trioxide converter, then to the oleum tower and/or absorber. Energy Recovery in a Regeneration Plant for H2SO4 Sludges and Spent Acid by Zoppi, C., G. Sozio, A. Nunzi in Applied Energy Vol. 36 Issue No. 1-2 (00/00/90)

Sulfide Ores And Smelter Gas Plants

The configuration of this type of plant is essentially the same as that of a spent acid plant with the primary exception that a roaster is used in place of the combustion furnace.

Elemental Sulfur Burning Plants

This is a dual absorption contact process sulfuric acid plant that burns elemental sulfur. In the Frasch process, elemental sulfur is melted, filtered to remove ash, and sprayed under pressure into a combustion chamber. The sulfur is burned in clean air that has been dried by scrubbing with 93 to 99 percent sulfuric acid. The gases from the combustion chamber cool by passing through a waste heat boiler and then enter the catalyst (vanadium pentoxide) converter. Usually, 95 to 98 percent of the sulfur dioxide from the combustion chamber is converted to sulfur trioxide, with an accompanying large evolution of heat. After being cooled, again by generating steam, the converter exit gas enters an absorption tower. The absorption tower is a packed column where acid is sprayed in the top and where the sulfur trioxide is absorbed in the 98 to 99 percent sulfuric acid. The sulfur trioxide combines with the water in the acid and forms more sulfuric acid.

If oleum (a solution of uncombined $SO_3$ dissolved in $H_2SO_4$) is produced, $SO_3$ from the converter is first passed to an oleum tower that is fed with 98 percent acid from the absorption system. The gases from the oleum tower are then pumped to the absorption column where the residual sulfur trioxide is removed.

In the dual absorption process the $SO_3$ gas formed in the primary converter stages is sent to an interpass absorber where most of the $SO_3$ is removed to form $H_2SO_4$. The remaining unconverted sulfur dioxide is forwarded to the final stages in the converter to remove much of the remaining $SO_2$ by oxidation to $SO_3$, whence it is sent to the final absorber for removal of the remaining sulfur trioxide. The single absorption process uses only one absorber, as the name implies.

Catalytic or Contact Process

Since the contact process is the only process currently used, it will be the only one discussed in this section. Contact plants are classified according to the raw materials charged to them: elemental sulfur burning, spent sulfuric acid and hydrogen sulfide burning, and metal sulfide ores and smelter gas burning. The contributions from these plants to the total acid production are 81, 8, and 11 percent, respectively.

The contact process incorporates 3 basic operations, each of which corresponds to a distinct chemical reaction. First, the sulfur in the feedstock is oxidized (burned) to sulfur dioxide ($SO_2$); then the resulting sulfur dioxide is fed to a process unit called a converter, where it is catalytically oxided to sulfur trioxide ($SO_3$); then the sulfur trioxide is absorbed in a strong 98 percent sulfuric acid solution.

OBJECTS AND ADVANTAGES

Accordingly, several objects and advantages of my invention are as a first object to eliminate high levels of sulfuric acid discharge in the form of wastewater from industrial plants. Yet another object is to recover a usable sulfuric acid from wastes and so reduce industrial plant operating costs. An additional object is to treat sulfuric acid waste in a manner such that designation as a legally defined "hazardous waste treatment facility" with requirement of appropriate permitting does not ensue for an industrial manufacturing plant or facility.

Advantages of the process are therefore reduction of operating costs and requirement for sulfuric acid raw materials; elimination of offsite shipping and transportation of hazardous waste, with attendant risks and liabilities; and elimination of expensive acid neutralization chemicals required before discharge of waste.

The process has the following production related advantages:

Continuous operation

Non-toxic and inexpensive chemicals are used

High purity sulfuric acid is recovered

Can operate at large and small production levels

Still further objects and advantages will become apparent from a consideration of the ensuing description and accompanying drawings.

BRIEF DESCRIPTION OF THE DRAWINGS

FIG. 2 is a calorimetry scan of the regeneration of sulfuric acid.

FIG. 3 is a temperature equilibrium profile showing conditions at which maximum sulfuric acid as $SO_3$ is produced. The figure is produced from theoretical free energy calculations and verified experimentally.

FIG. 5 shows equilibrium amounts of ferric oxide ($Fe_2O_3$) produced by the roasting operation. This is the material that is retained as a sulfate carrier in the process as ferrous iron.

FIG. 4 shows conditions at which $SO_2$ begins to be produced. $SO_2$ or sulfur dioxide, is an undesirable by-product.

Figure 1:
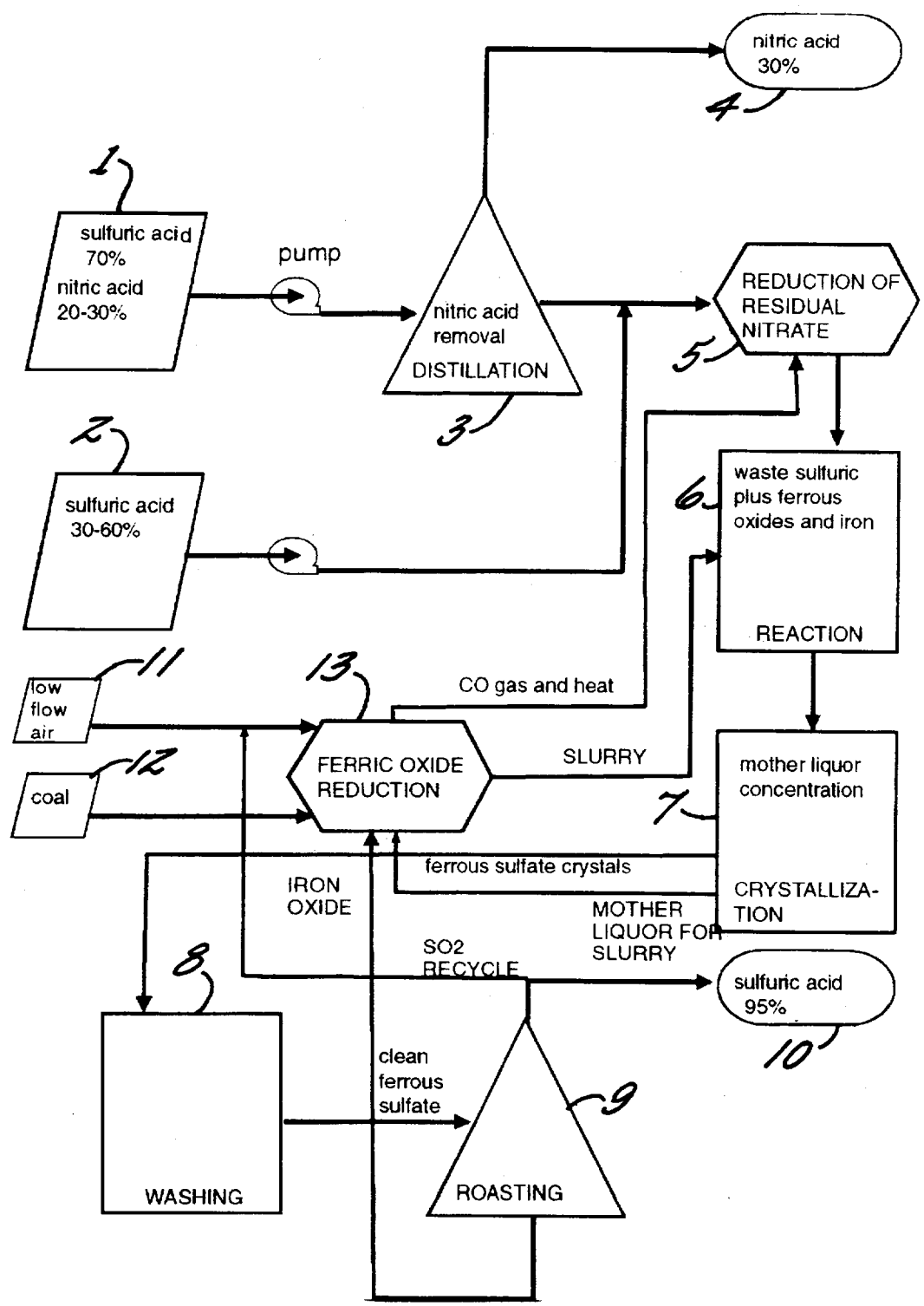
FIG. 1 is a flow diagram of the recyling process.

REFERENCE NUMERALS 1 feed stream high
2 feed stream low
3 auxiliary step nitric acid distillation
4 nitric acid product stream
5 fifth step slurrying and nitrate removal
6 first step neutralization
7 second step crystallization
8 washing operation
9 third step retort operation
10 sulfuric acid product stream
11 low flow air feed stream
12 coal feed stream
13 fourth step iron oxide reduction
14 thermal gravimetric data (TGA)
15 differential thermal gravimetric (DTA) data
16 thermochemical calculation of SO3 equilibrium
17 thermochemical calculation of SO2 equilibrium
18 thermochemical calculation of Fe2O3 equilibrium

SUMMARY

Sulfuric acid ia a major waste disposal problem in connection with sulfur dyes in the dye industry. The inventor William L. Klotz has developed a recycle recovery process for sulfuric acid waste streams evaluated for streams ranging from 30% to 70% acid content. Higher and lower concentration waste streams may be treated by conventional modifications of the process.

Recovering sulfuric acid solves disposal problems and yields a reusable product, but costs more than producing acid by conventional acid plants. Nevertheless, as environmental regulations tighten, many companies find that it may cost them even more not to reprocess spent acids. A typical regeneration of sulfuric acid involves roasting sulfates in a furnace above 1000 degrees C., converting into SO2. The SO2 is converted to SO3 by a catalyst, and is absorbed by water or sulfuric acid to yield concentrated acid or oleum, respectively.

This report demonstrates that spent sulfuric acid from industrial wastes can be recycled by recovering sulfuric acid with ferrous sulfate. This is achieved by neutralizing wastes with ferrous hydroxide to form ferrous sulfate with the reaction of sulfuric acid and ferrous hydroxide, and evaporation of water followed by crystallization of ferrous sulfate and separation of ferrous sulfate from the resulting slurry. These ferrous sulfate crystals are heated up to about 700 degrees C. in the Klotz process to regenerate sulfuric acid. This temperature is significantly lower than in other processes, and sulfuric acid is recovered without catalyst conversion. The nitrates present in the wastes are crystallized and separated from the wastes to prevent any explosion hazard.

The demonstration of the process was achieved in two ways, the results of which have been included here. In the first approach, ferrous sulfate is heated up to 1000 degrees C. to determine heats of decomposition, using an instrument called a Differential Thermal Analyzer, here the Shimadzu DTA-50. This is an instrument, in which the temperature of a sample can be raised up to 1500 degree C. to find the properties of the sample, such as temperature at which water is evolved, and temperature at which acid is emitted and so on. This is an experiment demonstrated to show that the sulfuric acid can be recycled from the wastes.

The second approach bulk testing and actual recovery of the sulfuric acid from the waste samples. In this demonstration a bulk amount of simulated dye wastes were used to regenerate the sulfuric acid.

Preferred Embodiment—Description

This is a description of a process with flow sheet FIG. 1 for recovery of spent sulfuric acid from industrial wastes using recycle by recovering sulfuric acid with ferrous sulfate. This is achieved by neutralizing wastes with ferrous hydroxide to form ferrous sulfate with the reaction of sulfuric acid and ferrous hydroxide, and evaporation of water followed by crystallization and washing operation 8 of ferrous sulfate and separation of ferrous sulfate from the resulting slurry. These ferrous sulfate crystals are heated up to about 700 degrees C. in this process, hereinafter refered to as the Klotz process, to regenerate sulfuric acid. This temperature is significantly lower than in other processes, and sulfuric acid is recovered without catalyst conversion. The nitric acid present in the wastes shown as nitric acid product stream 4 is removed by distillation and residual nitrates are reduced to prevent any explosion hazard.

Description of the process is made with reference to FIGS. 1–5. The process will recover sulfuric acid in the 90–95% concentration range as sulfuric acid product stream 10 by roasting of ferrous sulfate hydrate crystals at high temperature under retort conditions in retort operation 9. In the first step neutralization 6 of the recovery process hydroxide slurry is reacted with the waste stream, and ferrous sulfate crystals are obtained as in the conventional pickle liquor process. In the third step retort operation 9 iron sulfate crystals are roasted and water of hydration reacts with sulfate and released sulfur trioxide to produce sulfuric acid. The sulfuric acid is condensed and is of a high purity, leaving iron oxide as a residue.

In the fourth step iron oxide reduction 13, this iron oxide is reduced to the ferrous oxidation state using a reducing stream such as coal feed stream 12 with reducing conditions such as low flow air feed stream 11 and in the fifth step slurrying and nitrate removal 5 is slurried with supernatant from the crystallization step, to form iron oxide/hydroxide slurry, which is reacted with the entering sulfuric acid waste stream. Any residual nitrate entering the first step neutralization 6 may be removed by reducing gases in fifth step slurrying and nitrate removal 5. In FIG. 1, provision has been made for the removal of nitric acid in auxiliary step nitric acid distillation 3 by distillation to prevent formation of explosive nitrates.

This sulfuric acid recovery and recycling process is to be used at industrial facilities and has been demonstrated for concentrations of sulfuric acid present as waste streams in these facilities in the concentration range of 30–70% shown as two feed streams feed stream high 1 and feed stream low 2 in FIG. 1.

The concept for this process was conceived by William L. Klotz after learning of pollution problems at a textile dye plant and was proposed by him to that plant for feasibility evaluation Oct. 23, 1993. Additional proposal was made by William L. Klotz to the State of North Carolina Office of Waste Reduction by documented date of Jun. 30, 1994. OWR feasibility testing and process design have been completed as of May 15, 1996, and application is hereby made for patent for this process by its originator. These feasibility data including differential thermal gravimetric (DTA) data 15; thermal gravimetric data (TGA) 14; thermochemical calculation of SO3 equilibrium 16; thermochemical calculation of SO2 equilibrium 17; and thermochemical calculation of Fe2O3 equilibrium 18, by the HSC commercial computer program, are included in this application and have been sufficient for design of a pilot test and actual recovery of the sulfuric acid from the waste samples. In demonstration a bulk amount of simulated dye wastes was used to regenerate the sulfuric acid. The process flow chart is provided herein, and experimental and literature data and references are also provided.

The pilot process is designed to utilize coal as a heating fuel and as a reducing agent as coal feed stream 12 to fourth step iron oxide reduction 13 for iron oxide intermediate in the process. In the full scale process, considerable heat can be recovered from the reduction step and utilized for nitric acid separation and mother liquor concentration for ferrous sulfate crystallization. The process described here is batch process in nature, however it can readily be converted to continuous in the full scale process. Off-gases from iron oxide are used to remove residual nitrates from the feed stream, increasing the safety of the process.

Preferred Embodiment—Operation

Further operation of the process is provided by reference to the flow diagram for this process is shown in FIG. 1 as process steps. The process can be continuous or batch, but pilot demonstration is most conveniently implemented as batch operation.

The process is designed for a mixing of high and low waste acid concentration feed stream high 1 and feed stream low 2. The high concentration acid stream feed stream high provides high sulfate concentration which decreases the solubility of ferrous sulfate, enhancing crystallization in second step crystallization 7. Nitric acid is considered possibly present, here in the feed stream high 1 at 20–30% levels. This may be removed and recovered by distillation, and used to produce fertilizer or recycled. For the general process, high and low acid concentration waste streams can be processed separately or together.

Upon completion of the auxiliary step nitric acid distillation 3 and reaction with reduced iron oxide in first step neutralization 6, the stream is concentrated by evaporation and cooled, resulting in the formation of ferrous sulfate crystals in second step crystallization 7. In the full scale process, the mother liquor will maintain a slurry for transport of the crystals to a filter. In small scale operation, this can be a manual transfer. Waste mother liquor could be sold to water treatment plants as ferrous sulfate for flocculation. Crystals may be washed in washing operation 8 prior to retorting in third step retort operation 9 to prevent the accumulation of other salts in the process.

Ferrous sulfate crystals (hexahydrates) are recovered from the filter and retorted, or calcined, to a maximum temperature of 725° C. Essentially pure sulfuric acid or sulfur trioxide 16 shown in FIG. 3 can be recovered by condensing the distillate or passing it through water or dilute sulfuric acid. The residue left is ferric oxide, see thermochemical calculation of Fe2O3 equilibrium 18 and hydroxide as shown in FIG. 5. Powdered coal or other reducing agent is mixed with this material, and a flow of air, low flow air feed stream 11, much lower than required for complete combustion is passed through the mixture resulting in partial combustion with generation of heat, and generation of reducing gases. The ferric iron is reduced in fourth step iron oxide reduction 13 to ferrous and metallic iron, suitable for recycle in the process. This reduced iron is then reacted in first step neutralization 6 in the process with waste acid streams.

Heat is generated by reaction of iron oxides with acids and partial combustion of powdered coal and is available to the process.

The following considerations are key to operation:
1. Roasting, or retorting of ferrous sulfate crystals should be done over the temperature range of ambient to 750° C. This is a relatively low temperature that can be achieved with coal combustion supplemented with process heat in the full scale process. Any heat source may be used for pilot demonstration.
2. Nitric and sulfuric acids will be recovered, i.e., condense, at their boiling points or in the case of sulfuric acid absorbtion by water or sulfuric acid, about 95 C.

3. Iron oxide reduction 13 should be conducted at a flow rate of air 11 of about 10% of that required for complete combustion in a 10 hour period. Optimization of this step mayl require modeling of the combustion process and could require briquetting of iron and powdered coal. The air flow rate and combustion gas oxygen level can be controlled and monitored during operation to maintain reducing conditions.

This information should be adequate for sizing of the system. Thermal performance data for retorting of ferrous sulfate crystals are in FIG. 2, showing evolution of water of hydration up to about 130° C. and sulfuric acid and sulfur trioxide evolution 14 and 15 at about 680°–750° C. with differential thermal analysis and thermal gravimetric analysis results for heat release and mass change for ferrous sulfate hexahydrate. Undesirable sulfur dioxide production 16 occurs above 750° C. shown in FIG. 3.

Scale up testing to date for the pilot process indicates that temperature control in the roasting mass of ferrous sulfate is critical. This temperature must not exceed 750° C. At 1000° C. sulfuric acid equilibrium favors sulfur trioxide. At 1100° C. sulfur trioxide decomposition equilibrium favors oxygen and sulfur dioxide. Heat release data and TGA data for the process indicate a maximum energy cost of 8105 kj/kg of ferrous sulfate heptahydrate crystals. With an optimally designed process, waste heat from roasting will be available for distillation of nitric acid.

Percent recovery of sulfuric acid should be improved by retaining some nitric acid in the roasting process. Nitric oxide, NO, catalyzes the reverse production of sulfur trioxide from the dioxide and oxygen.

With an expected recovery of 80 percent of sulfuric acid waste, and an energy cost of $0.05/kW-hr, the process cost per kg of sulfuric acid as 95% sulfuric is $0.05/kW-hr×2.778 (−4) kJ/kW-hr×8105 kJ/kg/0.38 kg/kg/0.80*0.95=$0.35/kg sulfuric acid.

Cost for natural gas would be $3.75/million BTU, and for coal $1.90/million BTU. With these fuels, cost would be $0.089 and $0.045/kg sulfuric acid respectively.

Technical Limitations

Applications

For the process described here, the specific application considered is acid dye manufacture where fuming sulfuric acid combined with high percentages of nitric acid are utilized. There are numerous applications throughout industry, such as the pickling of steel, wood pulp bleaching in the paper industry, electroplating and metal finishing, and acid battery manufacture, where recovery of sulfuric acid from toxic and corrosive wastes containing sulfite, sulfate, or acid sulfate residuals would be desirable. This process is capable of modification and tailoring to suit these applications.

Initial Sulfuric Acid Concentration

Currently the process appears practical for acid concentrations as low as 20%, with no limit on maximum concentration. The lower concentration limit can be further lowered by use of techniques to lower the solubility of ferrous sulfate such as addition of organics or other sulfate salts which may be present in a waste stream or by immobilizing the ferrous oxide on an insoluble matrix.

Volumes Treated

The process can be operated in batch or continuous mode. For this reason, there is no inherent limit on the volumes treated.

Space Requirements

The process can be installed vertically with appropriate platform supports, and so would require relatively little square footage. It is estimated that to produce 1000 gal per day (3785 liters/day) of 90% sulfuric acid from the textile acid dye process waste stream would require about 9000 square feet with all components at ground level.

Quality of Recovered Sulfuric Acid

Recovered sulfuric acid will be comparable to technical grade 90% sulfuric acid. The process could be modified to produce high purity fuming sulfuric acid.

Safety Considerations

The distillation of sulfuric and nitric acids must be staged so that most nitric acid is removed at low temperature comparable to its boiling point of about 120 degrees C. The formation of nitrates in the presence of organics in the process should be prevented to avoid explosion hazards. For this reason nitrates are reduced to nitrites subsequent to nitric acid distillation.

Economic Considerations

Start up Costs

Equipment, construction and debugging costs for a 1000 gal per day (3785 liters/day) recovered 90% sulfuric acid for the textile dye process are estimated at $360,000 in 1995 dollars.

Operating Costs

Depreciation of equipment, taxes, insurance cost, labor hours, fuel costs, and other utility costs are estimated at $1020 per day.

Value of Sulfuric Acid

Under these conditions, the recovey cost of the sulfuric acid is $1.02 per gallon ($0.15/kg). Market value for technical grade sulfuric acid is about $0.14/kg.

CONCLUSIONS, RAMIFICATIONS, AND SCOPE

Accordingly, it can be seen that this process provides a new alternative to recycle of a waste chemical, sulfuric acid, ubiquitous in the industrial arena, which may be readily implemented.

Although the description above contains many specificities, these should not be construed as limiting the scope of the invention but as merely providing illustrations of some of the presently preferred embodiments of this invention. Various other embodiments and ramifications are possible within it's scope. For example, any processes utilizing sulfate and sulfites may benefit from the invention. Other acidic pollutants which may bind with ferrous/ferric iron as a carrier may be removed similarly, and regenerated by displacement with sulfuric acid, a high boiling acid.

Thus the scope of the invention should be determined by the appended claims and their legal equivalents, rather than by the examples given.

What is claimed is:

1. A pollution control process for recycling a sulfuric acid waste stream comprising the steps of:

a. forming an iron oxide/hydroxide slurry and reacting said slurry with said sulfuric acid waste stream to neutralize acid values and to form ferrous sulfate crystals;

b. separating said ferrous sulfate crystals;

c. retorting said ferrous sulfate crystals at a temperature ranging from approximately 550 degrees Celsius to 750 degrees Celsius to produce sulfuric acid or sulfur trioxide, ferric oxide and sulfur dioxide;

d. separating the sulfuric acid, sulfur trioxide and sulfur dioxide from the ferric oxide leaving a ferric oxide as a residue, said ferric oxide being recovered;

e. separating the sulfur dioxide from the sulfuric acid and sulfur trioxide;

f. reducing said ferric oxide to ferrous iron using the sulfur dioxide separated in step (e);

g. wherein said recycle of sulfur dioxide both reduces said ferric oxide and provides a substantially pure sulfuric acid; and h. recycling said ferrous iron for reaction in step (a).

2. The process of claim 1, wherein in said retorting step said ferrous sulfate crystals are roasted and water of hydration reacts with sulfate and released sulfur trioxide to produce sulfuric acid.

3. The process of claim 2, wherein said sulfuric acid or sulfur trioxide regenerated during the retorting step is condensed to recover a substantially pure sulfuric acid.

4. The process of claim 2, wherein said retorting step is conducted at a temperature ranging from 700 degrees Celsius to 750 degrees Celsius.

5. The process of claim 1, wherein the step of reducing said ferric oxide to ferrous iron comprises mixing a reducing agent with said ferric oxide to form a mixture and passing an air feed stream including said recycled sulfur dioxide through the mixture, wherein said air feed stream supplies air in an amount less than that required for complete combustion.

6. The process of claim 3, wherein said sulfuric acid waste stream includes nitric acid and further comprising a step of removing nitric acid by distillation prior to reacting step (a) to prevent formation of explosive nitrates.

7. The process of claim 6, comprising a step of removing nitrates remaining after said distillation by maintaining a reducing atmosphere during the formation of said slurry in step (a) of claim 1.

8. The process of claim 5, wherein the reduction of said ferric oxide to ferrous iron further forms metallic iron and recycling said metallic iron for reaction in step (a).

9. The process of claim 5, wherein said reducing step is conducted with approximately 10 percent of the air required for complete combustion.

10. The process of claim 1, further comprising a step of washing said sulfate crystals prior to retorting step (c) to prevent accumulation of other salts.

11. A pollution control process for recycling a sulfuric acid waste stream comprising the steps of:

a. reacting ferrous hydroxide with said sulfuric acid waste stream to neutralize acid values and to form ferrous sulfate crystals;

b. separating said ferrous sulfate crystals;

c. retorting said ferrous sulfate crystals at a temperature ranging from 550 degrees Celsius to 750 degrees Celsius to produce sulfuric acid or sulfur trioxide, iron oxide and sulfur dioxide;

d. separating the sulfuric acid, sulfur trioxide and sulfur dioxide from the iron oxide leaving an iron oxide as a residue, said iron oxide being recovered;

e. separating the sulfur dioxide from the sulfuric acid and sulfur trioxide;

f. reducing said iron oxide to ferrous iron using the sulfur dioxide separated in step (e);

g. wherein said sulfur dioxide both reduces said iron oxide and provides substantially pure sulfuric acid;

h. slurrying said iron oxide with ferrous hydroxide to form a iron oxide/hydroxide slurry providing the ferrous hydroxide for step (a) and reacting said slurry with said sulfuric acid waste stream to neutralize acid values and to form ferrous sulfate crystals; and i. repeating steps (b) through (h).

12. The process of claim 11, wherein step (g) further includes the step of condensing substantially pure sulfuric acid from the gases of steps (d) and (g).

* * * * *